(12) United States Patent
Dittrich et al.

(10) Patent No.: US 8,955,748 B2
(45) Date of Patent: Feb. 17, 2015

(54) INVENTORY MONITORING OF LIVE-STORAGE SYSTEMS BY MEANS OF RFID

(75) Inventors: Gerald Dittrich, Thurnau (DE); Alexander Lorenz, Schleiz (DE)

(73) Assignee: Brooks Automation (Germany) GmbH, Mistelgau (DE)

( * ) Notice: Subject to any disclaimer, the term of this patent is extended or adjusted under 35 U.S.C. 154(b) by 66 days.

(21) Appl. No.: 13/703,234

(22) PCT Filed: May 12, 2011

(86) PCT No.: PCT/EP2011/057690
§ 371 (c)(1),
(2), (4) Date: Dec. 10, 2012

(87) PCT Pub. No.: WO2011/154213
PCT Pub. Date: Dec. 15, 2011

(65) Prior Publication Data
US 2013/0075470 A1 Mar. 28, 2013

(30) Foreign Application Priority Data

Jun. 11, 2010 (DE) .......................... 10 2010 029 996

(51) Int. Cl.
*G06K 7/01* (2006.01)
*G06Q 10/08* (2012.01)

(52) U.S. Cl.
CPC ................ *G06K 7/01* (2013.01); *G06Q 10/087* (2013.01)
USPC ...................................................... 235/385

(58) Field of Classification Search
USPC .................................... 235/385, 383; 307/149
See application file for complete search history.

(56) References Cited

U.S. PATENT DOCUMENTS

| 7,602,288 B2 * | 10/2009 | Broussard ................. 340/572.1 |
| 2005/0216119 A1 * | 9/2005 | Hamilton ..................... 700/224 |
| 2006/0158043 A1 * | 7/2006 | Brouwer et al. .............. 307/149 |
| 2008/0186167 A1 | 8/2008 | Ramachandra |

FOREIGN PATENT DOCUMENTS

| FR | 2 885 435 A1 | 11/2006 |
| JP | 4140136 B2 | 8/2008 |
| WO | WO 2009/143814 A1 | 12/2009 |

OTHER PUBLICATIONS

International Search Report dated Aug. 19, 2011 issued in PCT/EP2011/057690.

* cited by examiner

*Primary Examiner* — Daniel Hess
(74) *Attorney, Agent, or Firm* — Scully, Scott, Murphy & Presser, P.C.

(57) ABSTRACT

The present invention relates to a radio-frequency identification communications system, RFID communications system, for monitoring the inventory of a live storage system, comprising at least one first and one second stationary RFID antenna (5, 6) for transmitting data; and an RFID transponder (2) attached to an object or a group of objects (1), wherein the RFID transponder (2) electronically stores a code of the object or the group of objects (1), and wherein the first RFID antenna (5) is placed in an input region, and the second RFID antenna (6) is placed in an output region of a storage track of the live storage system, in order to register the object or the group of objects (1) on the basis of the code of the RFID transponder (2).

36 Claims, 3 Drawing Sheets

INVENTORY MONITORING OF LIVE-STORAGE SYSTEMS BY MEANS OF RFID

The present invention describes the automatic inventory monitoring of live storage systems by means of a radio-frequency identification communications system (RFID communications system).

Live storage systems are storage systems which, inter alia, are charged with goods by means of driven roller trolleys on live tracks or by means of roller tracks on live shelving systems. With the use of live shelving systems, the shelves are charged from one side, in that the goods are supplied in containers or on pallets to the roller tracks of the live shelving system, while they can be removed again from the other side from the previously stored goods. By way of distinction from the variant with live shelving systems, in the case of live tracks, the goods are displaced on roller trolleys in rolling containers or on rolling pallets.

RFID Communications systems for inventory logistics generally comprise an RFID device for reading from and/or writing to a transponder, which is attached to the objects, products, containers or pallets. For this purpose, an antenna is electrically connected to the RFID device, which is either integrated in the RFID device in a fixed manner, or used as an external device. For communication with the transponder, the antenna of the RFID device generates an electromagnetic field in the radio-frequency range, which induces a voltage in an antenna of the transponder. In this context, the following frequency ranges and distance ranges are typically used:

| Frequency type | Frequency range | Range |
| --- | --- | --- |
| Long-wave frequencies (LF) | 30 ... 300 kHz | 50 cm |
| Short-wave frequencies (HF/RF) | 3 ... 30 MHz | 1 m |
| Ultra-high frequencies (UHF) | 0.3 ... 3 GHz | 3-15 m |

Accordingly, on one hand, the data can be transmitted between the RFID device and the transponder. On the other hand, the transponder is supplied with energy. RFID communications systems provide numerous possible applications, such as, automatic data registration or automatic object identification. Possible areas of application thus include traffic monitoring, control of production logistics, identification of persons and real-time certification of banknotes.

Current inventory systems use RFID communication in order to register the removal of goods at the output end of live storage systems and accordingly to register and control the inventory level. For this purpose, the goods fitted with an RFID transponder are guided past a stationary RFID device with an antenna when they leave the live storage system so that the code stored in the transponder can be read. In this manner, the goods output is automatically registered and correspondingly booked in a logistics system.

However, the disadvantage with the prior art just described is that only the output end is operated with an RFID scanner, but no RFID scanner is provided at the input end. Accordingly, since no identification of the containers or the pallets takes place within the input procedure, it is not possible to monitor whether the container or the pallet is intended in the first place for this live shelving unit or track. There is therefore a risk that the inventory is charged with incorrect items, which must subsequently be sorted and removed and which therefore obstruct the inventory logistics.

The object of the present invention is therefore to improve the prior art. In particular, the object of the invention is to provide an automatic inventory monitoring of a live storage system by means of an RFID communications system which comprehensively automates inventory management and automatically updates and optimises the inventory level.

This object is achieved by a radio-frequency identification communications system, RFID communications system, for monitoring the inventory of a live storage system according to claim 1.

The RFID communications system according to the invention comprises at least one first and one second stationary RFID antenna for transmitting and receiving data and an RFID transponder attached to an object or a group of objects, wherein the RFID transponder electronically stores at least one code of the object or the group of objects, and wherein the first RFID antenna is positioned in an input region, and the second RFID antenna is positioned in an output region of a storage track of the live storage system in order to register the object of the group of objects on the basis of the code of the RFID transponder.

The RFID communications system according to the invention accordingly allows goods to be registered before they are received in the inventory. For this purpose, the object, products, goods or respectively containers fitted with an RFID transponder are introduced at the input and identified by a stationary RFID antenna at the input end by reading identification data (code) stored in the transponder. Accordingly, on the one hand, receiving incorrect articles into the inventory is avoided, and on the other hand, when articles are removed, an automatic re-ordering can be implemented, because information on the inventory level is available in the respective storage track through the input scan. In consequence, inventory logistics are facilitated and unnecessary orders are avoided.

In order to comply with the requirements for the respective inventory logistics, RFID antennas can be dismantled at any time in order to re-install them in another appropriate position in the warehouse.

In a first embodiment, the object or the group of objects comprises containers or pallets, wherein the storage track comprises a shelving system with a roller track in order to receive the containers or pallets.

In a second embodiment, the object of the group of objects comprises roller trolleys, wherein the storage track consists of a track, on which to displace and store the roller trolleys.

The RFID communications system according to the invention advantageously further comprises at least one presence sensor for registering the presence of an object or a group of objects in the input and/or output region of the storage track.

A first presence sensor is advantageously positioned in the input region, and/or a second presence sensor is advantageously positioned in the output region of the storage track of the live storage system.

Furthermore, the reading mode of the RFID antennas for registering the RFID transponders is advantageously only activated when the presence sensors report a change.

The object or the group of objects can be advantageously held by a holding device until they have been identified by means of the code of the RFID transponder.

The object or the group of objects can be advantageously checked on the basis of the code of the RFID transponder regarding whether the object or the group of objects have been released for the storage track.

Furthermore, the holding device can advantageously release or block the object or the group of objects dependent upon the result of the check.

An inventory level of the storage track is advantageously increased when the holding device releases the object or the group of objects.

Conversely, the inventory level of the storage track is advantageously reduced when the object or the group of objects is removed from the storage track after passing the second RFID antenna.

The removal can be advantageously detected in that the RFID transponder is no longer readable and/or the presence sensor reports a change.

The holding device can advantageously comprise a mechanical pin or a magnet.

Furthermore, the RFID communications system can advantageously generate a check-back signal when the first RFID antenna has identified the object or the group of objects, wherein a check-back signal is ideally implemented via an acoustic or optical signal.

The RFID communications system can advantageously generate a check-back signal when the second RFID antenna has identified the object or the group of objects, wherein a check-back signal is ideally realised via an acoustic or optical signal.

In the following section, the present invention will be described in greater detail on the basis of the two preferred embodiments mentioned in the introduction with reference to the attached FIGS. 1-13, FIG. 1 shows the first embodiment of the invention as a typical roller track of a live shelving system for containers;

Figure 1:
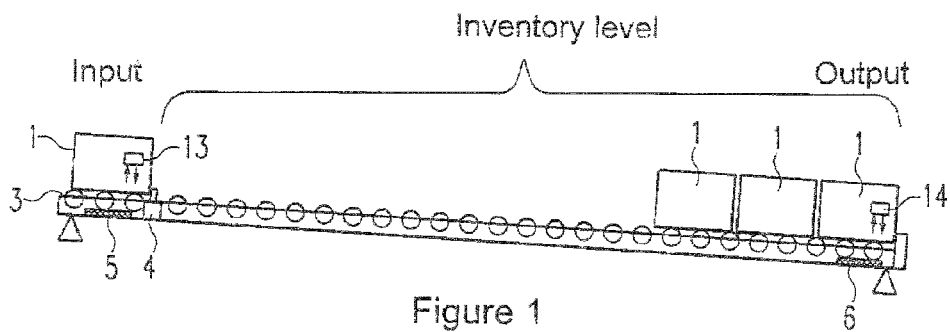

FIG. 1 shows a typical roller track 3 of a live shelving system for objects, such as products, goods, containers, pallets etc. 1, according to a first embodiment of the present invention. The objects 1 fitted with an RFID transponder 2 are positioned and registered at the input. The input identification is implemented either with or without a presence sensor 13. Without a presence sensor, the RFID antenna mounted in the input region must be set constantly in the reading mode (polling), in order to register whether an RFID transponder 2 is disposed within the identification range of the RFID antenna 5 mounted in a stationary manner in the input region. With a presence sensor 13, the RFID antenna 5 need only read when the presence sensor reports a change and can therefore save power. In this context, presence sensors determine only whether an object with or without RFID transponder is disposed within their range. The object 1 is held by a holding device 4, for example, a mechanical pin or a magnet, until the latter has been identified by means of RFID.

Figure 2:
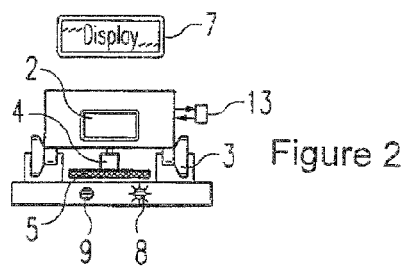
FIG. 2 shows various examples of input-end check-back signal devices.
Figure 3:
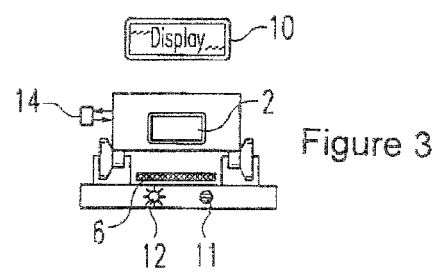
FIG. 3 shows various examples of output-end check-back signal devices.

FIG. 2 and FIG. 3 show examples of input-end and output-end check-back signal options. The check-back signal can be implemented at the input end, for example, via an acoustic or optical signal (7, 8, 9). A check-back signal via another interface is also possible. If an attempt is made to introduce an object 1 which has not been released, a warning lamp 8 issues a corresponding signal, and the non-released object is blocked by the holding device 4. At the output end, the indicator lamp 12 signals that the correctly stored objects are ready for output. Displays with corresponding messages can be used additionally or alternatively, both at the input end and also at the output end.

Figure 4:
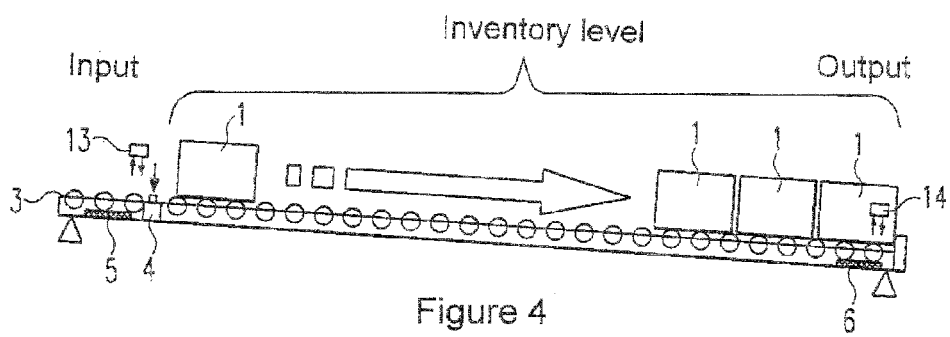
FIG. 4 shows a typical roller track of a live shelving system for containers for the case that a correct container has been introduced.

FIG. 4 shows a further example of a typical roller track 3 of a live shelving system for objects 1 in the case that a released object has been introduced. Since the object has been identified, after reading its RFID transponder, as released for the roller track, the holding device releases the object, which now slides down the inclined roller track into the inventory in the direction towards the output. If the check has a negative outcome, the object 1 must be removed. If the object 1 is allowed to enter, the inventory of the live shelving system is increased and registered in the evaluation system. Moreover, the inventory management described is not restricted to one live shelving system, but groups of shelving units which comprise live shelving systems arranged side-by-side or one above the other are also conceivable. In this case, the inventories of the individual live shelving systems are registered centrally and booked correspondingly.

Figure 5:
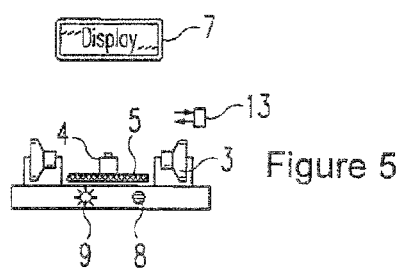
FIG. 5 shows various examples of input-end check-back signal devices for the case that a correct container has been introduced.
Figure 6:
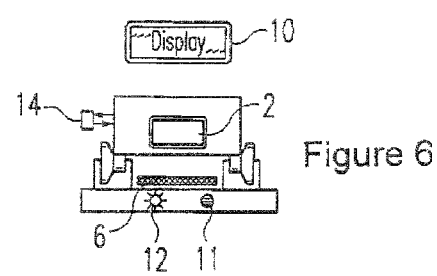
FIG. 6 shows various examples of output-end check-back signal devices for the case that a correct container has been introduced.

FIG. 5 and FIG. 6 show examples of input-end and output-end check-back signal options in the case that a correct article input has been implemented. The check-back signal can be given at the input end and also at the output end, for example, via an acoustic or an optical signal (7, 8, 9). A check-back signal via another interface, such as an internal booking system, is also possible. In this case, under some circumstances, system check-back signals can be dispensed with. In the case of the input of a released object 1, an indicator lamp 9 issues a corresponding signal, while the released object runs into the storage track unhindered. At the output end, the indicator lamp 12 again signals that the correctly stored objects are ready for output. Displays with corresponding signals can also be used additionally or alternatively at the input end and also at the output end.

Figure 7:
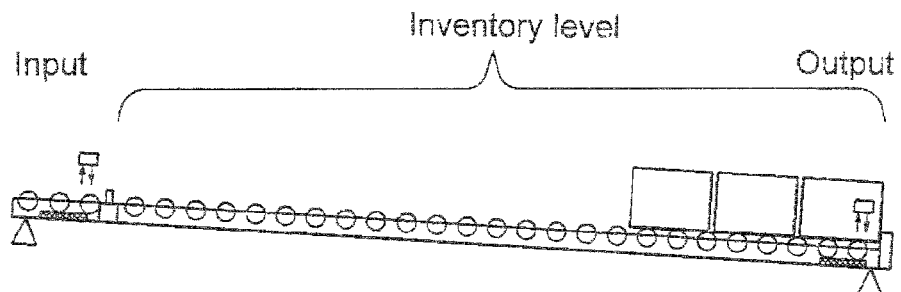
FIG. 7 shows a typical roller track of a live shelving system for containers, which are ready for output, after the front article has been registered.

FIG. 7 shows a further example of a typical roller track of a live shelving system for objects which are ready for output, after the front article has been registered as released.

Figure 8:
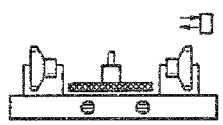
FIG. 8 shows various examples of input-end check-back signal devices for the case that the containers in the inventory are ready for output.
Figure 9:
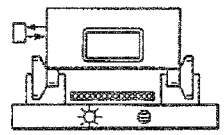
FIG. 9 shows various examples of output-end check-back signal devices for the case that the containers in the inventory are ready for output.

FIG. 8 and FIG. 9 once again show examples of input-end and output-end check-back signal options for the case of a successful storage procedure. Since the transponder can no longer be read at the input end because the object has entered the storage track and has already passed the first RFID antenna in the input region, no status indications are signaled and the lamps 8 and respectively 9 are not illuminated. By contrast, at the output end in FIG. 9, the indicator lamp 12 signals that the correctly stored objects are ready for output.

Figure 10:
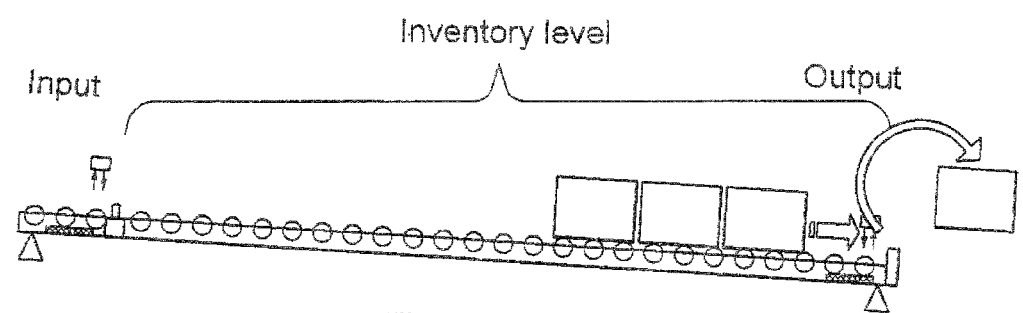
FIG. 10 shows a typical roller track of a live shelving system for containers, which are not ready for output when the front article has not been registered.

FIG. 10 shows a further example of a typical roller track 3 of a live shelving system for objects 1 in the case that an article has been removed at the output end. Now, the removal is identified in an analogous manner to the input situation in FIG. 1, in that the RFID transponder 2 can no longer be read and/or the presence sensor 14 report a change. Since a follow-on article has not yet reached the active range of the second RFID antenna 6 at this time, and accordingly, no further RFID transponder has been read or presence sensor reported a change, the inventory level of the live shelving system is reduced correspondingly in the evaluation system.

Figure 11:
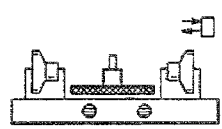
FIG. 11 shows various examples of input-end check-back signal devices for the case that the front container in the inventory is not ready for output.
Figure 12:
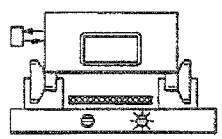
FIG. 12 shows various examples of output-end check-back signal devices for the case that the front container in the inventory is not ready for output.

FIGS. 11 and 12 show examples of input-end and output-end check-back signal options for the storage process described in FIG. 10. Since the article moving forward in this case has not yet been registered, the warning lamp 12 in FIG. 12 signals that a readiness for output is not yet present.

Figure 13:
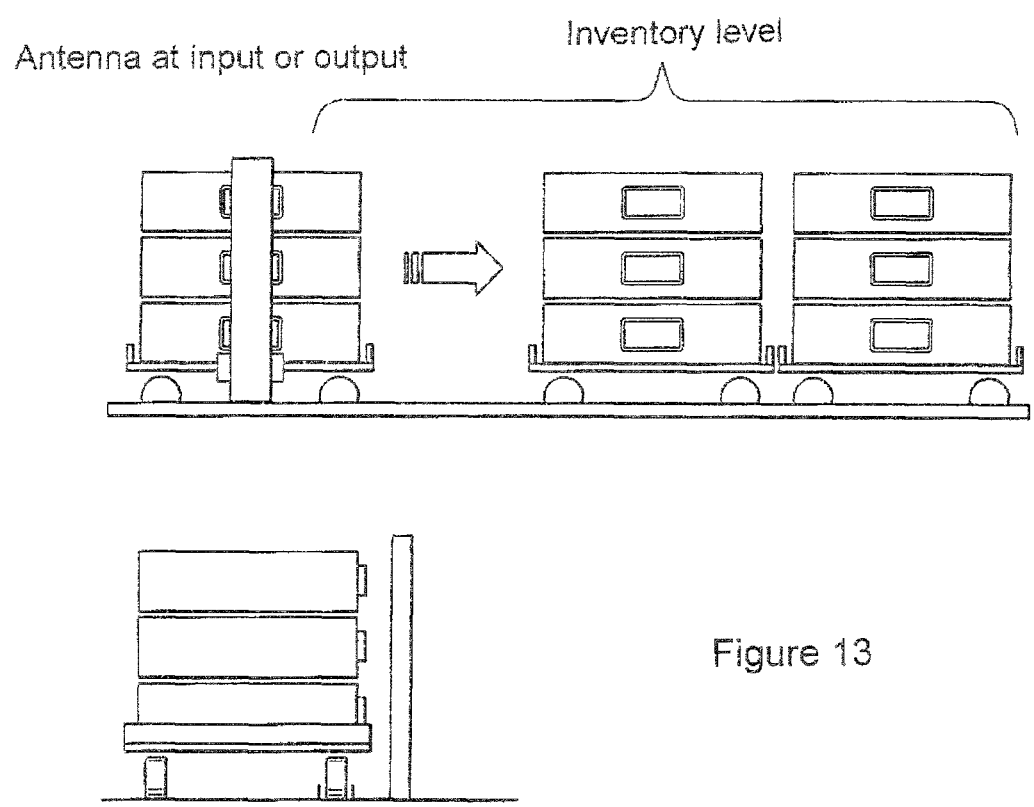
FIG. 13 shows a second embodiment of the invention, wherein the goods are introduced into the storage track in roller trolleys instead of as containers on roller tracks.

FIG. 13 shows a typical storage track for objects 1 according to a second embodiment of the present invention, with the difference that the storage track comprises a track in order to displace and store roller trolleys instead of a shelving system with roller tracks. The exemplary embodiments of a first embodiment of the present invention described above can also be used for this second embodiment of the present invention.

In general, the charging or removal of objects 1 described in the exemplary embodiment above can also be transferred to an ERP system as a booking message.

The present invention is not restricted to the exemplary embodiments described. On the contrary, one or more features of one exemplary embodiment can also be used in another exemplary embodiment.

The invention claimed is:

1. A radio-frequency identification communications system, RFID communications system, for monitoring the inventory level of a live storage system, comprising:
    at least one first and one second, stationary RFID antenna for transmitting and receiving data; and
    an RFID transponder attached to an object or a group of objects,
    wherein the RFID transponder electronically stores at least one code for the object or the group of objects,
    wherein the first RFID antenna is placed in an input region, and the second RFID antenna is placed in an output region of a storage track of the live storage system, in order to register the object or the group of objects on the basis of the code of the RFID transponder,
    wherein the object or the group of objects are held in the input region by a holding device until the object or the group of objects are identified by means of the code of the RFID transponder, and
    wherein the holding device comprises a mechanical pin.

2. The RFID communications system according to claim 1, wherein the object or the group of objects comprises containers or pallets.

3. The RFID communications system according to claim 2, wherein the storage track comprises a shelving unit with a roller track in order to receive the containers or pallets.

4. The RFID communications system according to claim 1, wherein the object or the group of objects is disposed on roller trolleys.

5. The RFID communications system according to claim 4, wherein the storage track comprises a track, upon which to store and displace the roller trolleys.

6. The RFID communications system according to claim 1, wherein the object or the group of objects can be checked on the basis of the code of the RFID transponder with regard to whether the object or the group of objects have been released for the storage track.

7. The RFID communications system according to claim 6, wherein the holding device releases or blocks the object or the group of objects dependent upon the results of the check.

8. The RFID communications system according to claim 7, wherein an inventory level of the storage track is increased when the holding device releases the object or the group of objects.

9. The RFID communications system according to claim 7, wherein the inventory level of the storage track is reduced when the object or the group of objects is removed from the storage track after passing the second RFID antenna.

10. The RFID communications system according to claim 9, wherein the removal can be identified in that the RFID transponder is no longer readable and/or the presence sensor reports a change.

11. The RFID communications system according to claim 1, wherein the holding device further comprises a magnet.

12. The RFID communications system according to claim 1, wherein the system generates a check-back signal when the first RFID antenna has identified the object or the group of objects.

13. The RFID communications system according to claim 12, wherein the check-back signal is realised via an acoustic or optical signal.

14. The RFID communications system according to claim 1, wherein the system generates a check-back signal when the second RFID antenna has identified the object or the group of objects before removal.

15. The RFID communications system according to claim 14, wherein the check-back signal is realised via an acoustic or optical signal.

16. The RFID communications system according to claim 1, wherein the RFID communications system further comprises at least one presence sensor that registers the presence of an object or a group of objects in the input and/or output region of the storage track.

17. The RFID communications system according to claim 16, wherein the at least one presence sensor comprises a first presence sensor placed in the input region and/or a second presence sensor placed in the output region of the storage track of the live storage system.

18. The RFID communications system according to claim 17, wherein the RFID antennas activate a reading mode for registering the RFID transponder only when the presence sensors report a change.

19. A radio-frequency identification communications system, RFID communications system, for monitoring the inventory level of a live storage system, comprising:
    at least one first and one second, stationary RFID antenna for transmitting and receiving data; and
    an RFID transponder attached to an object or a group of objects,
    wherein the RFID transponder electronically stores at least one code for the object or the group of objects,
    wherein the first RFID antenna is placed in an input region, and the second RFID antenna is placed in an output region of a storage track of the live storage system, in order to register the object or the group of objects on the basis of the code of the RFID transponder,
    wherein the object or the group of objects are held in the input region by a holding device until the object or the group of objects are identified by means of the code of the RFID transponder, and
    wherein the holding device comprises a magnet.

20. The RFID communications system according to claim 19, wherein the RFID communications system further comprises at least one presence sensor that registers the presence of an object or a group of objects in the input and/or output region of the storage track.

21. The RFID communications system according to claim 20, wherein the at least one presence sensor comprises a first presence sensor placed in the input region and/or a second presence sensor placed in the output region of the storage track of the live storage system.

22. The RFID communications system according to claim 21, wherein the RFID antennas activate a reading mode for registering the RFID transponder only when the presence sensors report a change.

23. The RFID communications system according to claim 19, wherein the object or the group of objects comprises containers or pallets.

24. The RFID communications system according to claim 23, wherein the storage track comprises a shelving unit with a roller track in order to receive the containers or pallets.

25. The RFID communications system according to claim 19, wherein the object or the group of objects is disposed on roller trolleys.

26. The RFID communications system according to claim 25, wherein the storage track comprises a track, upon which to store and displace the roller trolleys.

27. The RFID communications system according to claim 19, wherein the object or the group of objects can be checked on the basis of the code of the RFID transponder with regard to whether the object or the group of objects have been released for the storage track.

28. The RFID communications system according to claim 27, wherein the holding device releases or blocks the object or the group of objects dependent upon the results of the check.

29. The RFID communications system according to claim 28, wherein an inventory level of the storage track is increased when the holding device releases the object or the group of objects.

30. The RFID communications system according to claim 28, wherein the inventory level of the storage track is reduced when the object or the group of objects is removed from the storage track after passing the second RFID antenna.

31. The RFID communications system according to claim 30, wherein the removal can be identified in that the RFID transponder is no longer readable and/or the presence sensor reports a change.

32. The RFID communications system according to claim 19, wherein the holding device further comprises a mechanical pin.

33. The RFID communications system according to claim 19, wherein the system generates a check-back signal when the first RFID antenna has identified the object or the group of objects.

34. The RFID communications system according to claim 33, wherein the check-back signal is realised via an acoustic or optical signal.

35. The RFID communications system according to claim 19, wherein the system generates a check-back signal when the second RFID antenna has identified the object or the group of objects before removal.

36. The RFID communications system according to claim 35, wherein the check-back signal is realised via an acoustic or optical signal.

* * * * *